Patented Dec. 25, 1951

2,580,301

UNITED STATES PATENT OFFICE 2,580,301

POLYVINYL CHLORIDE RESIN PLASTICIZED WITH A MIXTURE OF POLYALKYLATED BENZOPHENONES

Herbert L. Johnson, Media, and Archibald P. Stuart, Norwood, Pa., assignors to Sun Oil Company, Philadelphia, Pa., a corporation of New Jersey No Drawing. Application August 12, 1949, Serial No. 110,043

3 Claims. (Cl. 260—32.8)

This invention relates to a novel plasticized composition made with a novel plasticizer and a polyvinyl resin.

In copending application for patent Serial No. 110,042 filed August 12, 1949, by the present inventors there is described and claimed a method for the preparation of a mixture of polyalkylated benzophenones. The product is also claimed.

According to this invention the mixture of polyalkylated benzophenones of the above-identified application for patent is used in plasticizing quantity to plasticize a polyvinyl chloride resin to form compositions useful for a large variety of purposes.

The weight ratio of plasticizer to polyvinyl chloride resin in the plasticized composition should be within the approximate range 1/10 to 3/2, preferably within the range 1/2 to 1/1. Compositions containing relatively too little of the plasticizer are too stiff for most purposes; those containing relatively too much of the plasticizer are too soft for most purposes.

The term, a polyvinyl chloride resin, will be understood to include copolymers of vinyl chloride with other compounds, e. g. vinyl acetate or vinyl cyanide.

According to the above-identified application for patent, the mixture of polyalkylated benzophenones is prepared by treating with phosgene in the presence of aluminum chloride a petroleum hydrocarbon fraction containing aromatics and boiling substantially through the range 300° F.-400° F. The product has a pale yellow color and boils through the range 392° F.-482° F. at 4 mm. Hg. The product has the carbon and hydrogen content of a ketone containing an average of two $C_9$ aromatic groups. In place of the entire fraction boiling through the range 300 F.-400° F. there may be used the essentially aromatic fraction which can be recovered from said fraction by known means, for example by the silica gel adsorption-desorption technique as described in United States Patent No. 2,398,101.

Since the described product is compatible with other plasticizers for polyvinyl resins, e. g. dioctyl phthalate or tricresyl phosphate, the former may be used as a plasticizer either alone or in admixture with such other plasticizers.

The following examples illustrate the invention.

Example I

Geon 101 (a commercial polyvinyl chloride) (76.05 grams), lead carbonate (1.24 grams) and stearic acid (0.59 gram) were mixed together in the dry state by ball milling. A plasticizer product (59.25 grams), prepared from an essentially aromatic fraction as described, was added in a cake mixer and the mass stirred thoroughly until good mixing was obtained. This mass was then fused on a 3" x 8" rubber mill whose rolls were heated to a temperature of about 285° F. The banded material was cut several times from each side and sheeted off at about 0.030 inch to give a rough sheet of about 0.070 inch when cooled. Part of this sheet was remilled to give a thin sheet of about 0.010 inch in thickness. Milling times were about 6 minutes and 2 minutes respectively. This thin sheet (0.01") furnished material for volatility, water extraction and light stability tests. After five minutes preheating at 160° C. the rough sheet was molded for 10 minutes at 1500 p. s. i. in a 5¾" x 5¾" steel mold to give a smooth sheet about 0.045" in thickness. This sheet (0.045") furnished material for hardness, brittle point and flammability measurements.

The compounded product was found to have a Shore A hardness of 68, a brittle point of 5° C., a heat stability of three hours (time for color change at 160° C.), a water extraction value of 0.04%, a volatility loss at 100° C. for three hours of 0.52%. The sheet had good color and practically no odor and was unchanged after exposure for 96 hours to the ultraviolet light from a General Electric H-11 mercury arc at a distance of 7 inches. A flammability test showed the sample to be self-extinguishing.

Example II

In a manner generally similar to that described in Example I, a plasticized polyvinyl chloride composition was prepared comprising Geon 101, dioctyl phthalate, and a plasticizer product prepared from an entire petroleum hydrocarbon fraction as described. The weight ratio of the plasticizer product to Geon 101 in the plasticized composition was 12/60; the weight ratio of dioctyl phthalate to Geon 101 was 28/60. The plasticized resin was found to have a tensile strength of 2400 lb./sq. in., an elongation of 265%, a brittle point of minus 40° F., a heat stability of 7 hours, a volatility loss of 0.16%, and a water extraction value of 0.05%.

Example II shows that by use of a plasticizer according to the invention in admixture with another plasticizer, such as dioctyl phthalate, better volatility and brittle point values may be obtained, while retaining other desirable properties, e. g. a higher tensile strength than that obtained using the other plasticizer alone.

We claim:

1. A composition comprising a polyvinyl chloride resin plasticized with a mixture of polyalkylated benzophenones obtained by treating a petroleum hydrocarbon fraction comprising aromatics and boiling substantially through the range 300° F.–400° F. with phosgene in the presence of aluminum chloride, said mixture boiling through the range 392° F.–482° F. at 4 mm. Hg, and comprising essentially diaryl ketones having an average of 19 carbon atoms per molecule.

2. A composition comprising a polyvinyl chloride resin plasticized with dioctyl phthalate and a mixture of polyalkylated benzophenones obtained by treating a petroleum hydrocarbon fraction comprising aromatics and boiling substantially through the range 300 F.–400° F. with phosgene in the presence of aluminum chloride, said mixture boiling through the range 392° F.–482° F. at 4 mm. Hg, and comprising essentially diaryl ketones having an average of 19 carbon atoms per molecule.

3. A composition comprising 10 parts by weight of a polyvinyl chloride resin plasticized with 1–15 parts of a mixture of polyalkylated benzophenones obtained by treating a petroleum hydrocarbon fraction comprising aromatics and boiling substantially through the range of 300° F.–400° F. with phosgene in the presence of aluminum chloride, said mixture boiling through the range 392° F.–482° F. at 4 mm. Hg, and comprising essentially diaryl ketones having an average of 19 carbon atoms per molecule.

HERBERT L. JOHNSON.
ARCHIBALD P. STUART.

REFERENCES CITED

The following references are of record in the file of this patent:

UNITED STATES PATENTS

| Number | Name | Date |
|---|---|---|
| 2,004,069 | Bruson et al. | June 4, 1935 |
| 2,349,413 | Hemperly | May 23, 1944 |
| 2,394,689 | Heyman | Feb. 12, 1946 |